Jan. 13, 1925.
J. F. O'CONNOR
1,522,534
FRICTION SHOCK ABSORBING MECHANISM
Filed July 12, 1920
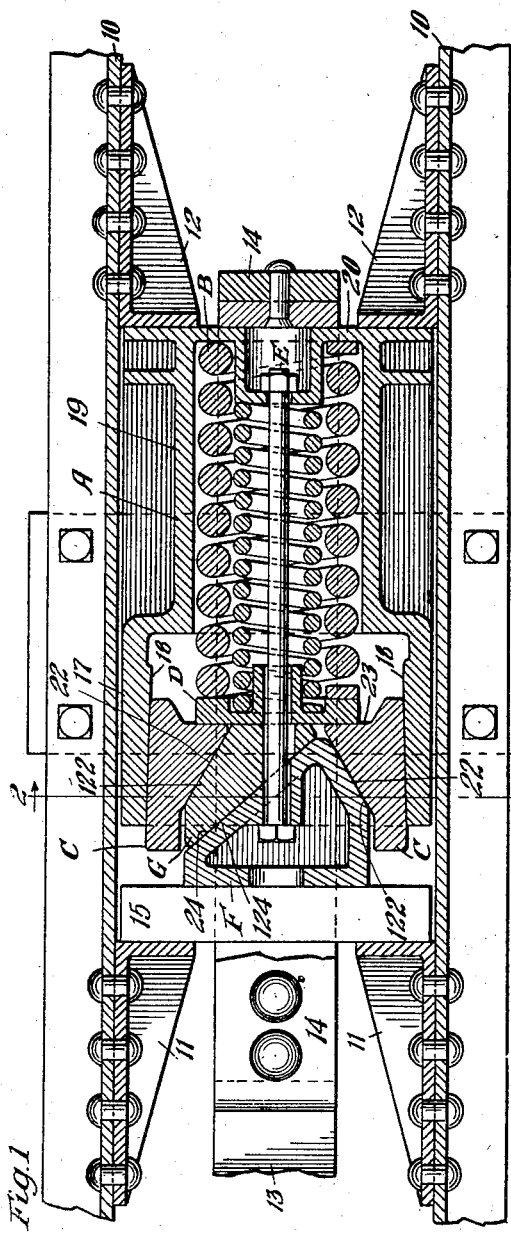
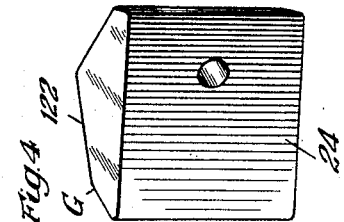
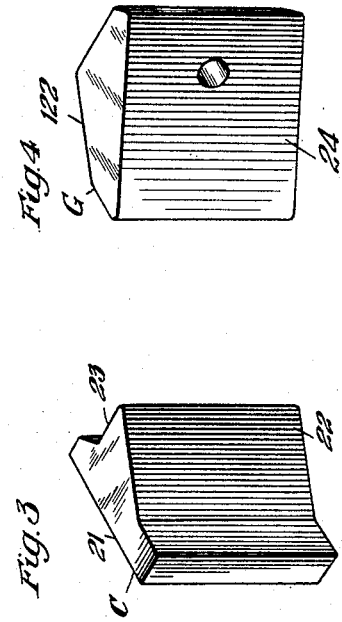
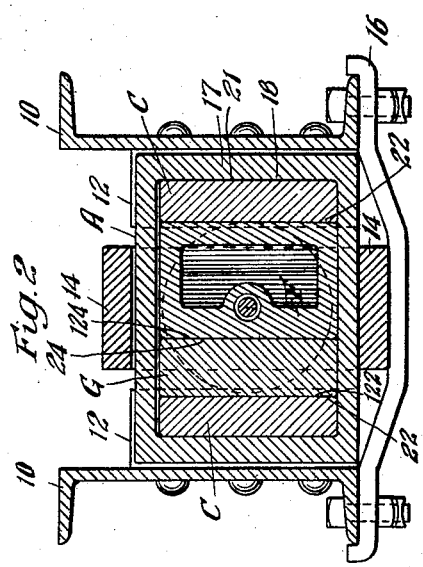
Witnesses
Wm. Geiger
Inventor
John F. O'Connor
By Geo. L. Haight
His Atty.

Patented Jan. 13, 1925.

1,522,534

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 12, 1920. Serial No. 395,456.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings wherein is obtained high capacity combined with certain release and the spreading means so designed as to produce a keen angled wedging effect during the compressive stroke and a blunt angled effect in release.

Another object of the invention is to provide a friction shock absorbing mechanism of the character indicated wherein are employed wedging means arranged to provide one set of inclined faces to effect the spreading action during the compressive stroke and another set of inclined faces to permit of the release or collapse of the wedging means.

A more specific object of the invention is to provide a friction shock absorbing mechanism of the character indicated wherein is employed a two-part wedge arranged to act as a solid keen angled wedge proper during compression and as a collapsible blunt-angled wedge during release.

Other objects of the invention will more clearly appear from the description hereinafter following.

In the drawing forming a part of this specification, Figure 1 is a horizontal sectional view of a portion of a railway draft rigging showing my improvements in connection therewith. Figure 2 is a vertical transverse sectional view taken substantially on the line 2—2 of Figure 1. And Figures 3 and 4 are detail perspectives of one of the friction shoes and one element of the wedge, respectively.

In said drawing, 10—10 denote channel shaped center or draft sills of a railway car to the inner faces of which are secured front stop lugs 11 and rear stop lugs 12. A portion of a drawbar is indicated at 13 to which is secured a yoke 14 of common form. The improved shock absorbing mechanism proper, hereinafter described, and a front follower 15 are contained within the yoke. The yoke and movable parts of the mechanism associated therewith are adapted to be supported by a detachable saddle plate 16.

The improved shock absorbing mechanism as shown, comprises, broadly, a combined friction shell and spring cage casting A; a spring B; a pair of friction shoes C—C; a spring follower D; a retaining bolt E; and a wedge consisting of two elements F and G.

The casting A is formed with a friction shell 17 at the forward end thereof, said shell being of substantially hollow rectangular box-like form and having a pair of opposed interior longitudinally extending friction surfaces 18—18. Rearwardly of the friction surfaces 18—18, the casting A is formed with a shell 17, the casting A is formed with a spring cage or casing 19, the latter having spring cage rear wall 20, adapted to act as an integral rear follower in cooperation with the rear stop lugs 12. The cage 19 is preferably of cylindrical form, suitably braced by flanges so as to properly center the spring B. The friction surfaces 18—18 are preferably made slightly inwardly converging to avoid any possibility of the distance therebetween, at any point inwardly of the mouth of the shell, being greater than the distance across the mouth which might otherwise arise from foundry processes. In this way all possibility of interference with proper release due to a contracted shell mouth, is avoided. The slight convergence of the surfaces 18 performs another function, as hereinafter described.

The friction shoes C are of like construction and each is formed on its outer side with a flat friction surface 21 and on its inner side with a wedging surface 22 which extends at a relatively keen wedging angle with respect to the axis of the mechanism and center line of draft under actuating forces applied lengthwise of the gear in buff or draft. Each shoe C is further provided with a horizontally extending face 23 at its inner end with which is adapted to engage the flat spring follower D, when the parts are in normal or full released position as shown in Figure 1. As clearly indicated in Figure 1, the forward ends of the two coils of the spring B bear against the follower D and the rear ends of said coils bear against the rear wall of the casting A.

The two wedge elements F and G are provide with engaging cooperable faces 24 and 124 which are extended at a relatively blunt and substantially non-wedge-acting angle with respect to the axis of the mechanism when actuating forces are applied thereto in lines parallel to said axis and which result from pulling or buffing movements of the drawbar. As will be understood by those skilled in the art, the exact angle of the faces 24 and 124 will vary in accordance with the material of which the wedge elements are made, the degree of shell taper and other factors but the primary consideration is that they shall be of such a blunt angle that, when pressure is applied to the member F in lines parallel or substantially parallel to the axis of the mechanism, the friction between the elements F and G will prevent the two elements from sliding or wedging in any substantial or appreciable degree, one on the other.

The element F is provided on one side thereof with a wedging face 122 cooperable with the adjacent wedge face 22 of the shoe C. Similarly, the other element G is provided with a wedge face 122 engageable and cooperable with the corresponding adjacent wedge face 22 of the other shoe C. In actual practice, the inner element G will normally bear against the follower D.

The retainer bolt E passes through suitable alined openings in the members F, G and D, through the center of the spring B and through a suitable opening in the rear wall of the casting A. The function of the bolt E is to hold the parts in assembled relation and also to hold the spring under an initial compression when desired.

The operation is as follows. Assuming a buffing or forward movement of the drawbar, pressure will be applied to the outer element F of the wedging means in lines substantially parallel to the axis of the mechanism. Due to the blunt angled position of the faces 24 and 124, no or at least a negligible amount of slippage or wedging action will occur between the two elements F and G and the same will act, for all practical purposes, as a solid unit. As the elements F and G act as aforesaid, it is evident that they constitute a keen angled wedge for spreading or pressing outwardly the two shoes C—C on account of the relatively acute angle provided at the surfaces 22 and 122. The shoes C are therefore pressed radially outward bodily against the friction surfaces 18 of the shell and gradually forced longitudinally with respect to the shell. As the shoes move inwardly of the shell, the latter is slightly expanded due to the enormous spreading pressure. During this compressive action, there will be a slight movement of the wedging unit as an entirety relatively to the shoes C and of sufficient scope to slightly remove the follower D from engagement with the faces 23 of the shoes. With this arrangement and operation, it is evident that the spring B contributes merely its own capacity to the total capacity of the mechanism and by far the greater part of the resistance is obtained frictionally between the shoes and the shell. At the termination of the compressive action, it is evident that enormous forces will be stored up in the friction shell due to the expansion which has occurred therein and upon removal of the actuating pressure, these forces in the shell will immediately contract the latter and in such a manner as to exert radially inwardly directed forces on the shoes, that is, forces substantially perpendicular to the axis of the mechanism. During this contraction of the friction shell, it is evident that the wedging faces 22 and 122 will be arranged at a relatively blunt angle with respect to radially inwardly directed forces and consequently no action will occur initially between the two sets of faces 22 and 122. However, the inclined faces 24 and 124 between the wedge elements F and G will be at such a releasing angle with respect to said radially inwardly directed forces arising from the contraction of the shell that the two elements of the wedge will readily slip laterally on each other thus consummating the collapse or release of the friction elements. Furthermore, the slightly tapered shell contributes to the ready release and restoration of the parts to normal position inasmuch as, after the friction elements have been initially collapsed or loosened, the spring is free to project the parts outwardly without danger of the shoes jamming or catching on the friction surfaces of the shell. Immediately upon the collapse of the friction elements, the spring B will come into play to restore the parts to their normal full released position and by finally engaging the inner ends of the two shoes, will insure that all of the parts will assume a taut or proper condition ready to receive the next blow.

Irrespective of the contracting forces of the shell and considering the elements F and G at the moment when the buffing or compressing forces cease, it will be noted that the element F is within an included angle defined by the blunt face 24 of the element G and the face 22 of the shoe C such that the element F is free to fall away from the face 24 and also the face 22, the latter opposing no resistance to such action. This in turn leaves the element G free to disengage itself, functionally, from the face 22 of the adjacent shoe C. The blunt faces 24 and 124 are obviously in transversely opposed relation with respect to the keen angle sets of faces 22 and 122 so that said keen angled faces are rendered effective to create the high frictional capacity during a compression stroke.

By the term "wedging" as herein used and applied to the sets of faces 22 and 122, I mean that, during a compression stroke of the mechanism, the faces 122 will slip or slide on the respective cooperating faces 22 in a manner overcoming the friction between the faces of each respective set 22 and 122. By the term "non-wedging" as herein used and applied to the faces 24 and 124, I mean that, in a compression movement of the mechanism, there will be no appreciable slippage of either of the faces 24 and 124 on the other. If there should be such slippage in either direction, it does not interfere in any way with the operation of the mechanism during compression in creating the high frictional capacity and the certain result is that the release of the mechanism will take place without difficulty by reason of the blunt or obtuse angle of said faces 24 and 124.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a friction shell having an interior pair of opposed longitudinally extending friction surfaces slightly inwardly converging; of a pair of friction shoes cooperable with the surfaces of said shell; a spring; and a two-part wedge cooperable with said shoes, each part of the wedge having relatively keen angled wedging engagement with one shoe, the two parts of the wedge having contacting faces extending at a relatively blunt angle with respect to the axis of the shell.

2. In a friction shock absorbing mechanism, the combination with a friction shell; of a spring; a plurality of friction shoes cooperable therewith, said shoes having wedge faces on their inner sides; and a multiple-part pressure receiving and transmitting wedge, said wedge having wedge faces on its exterior corresponding to and cooperable with said shoe wedge faces, all said wedge faces being symmetrically arranged with respect to the center of the shell, the parts of said wedge having a set of engaging faces inclined at an angle to but unsymmetrically arranged with respect to the axis of the shell, said set of engaging faces of the wedge parts permitting transverse collapse of the wedge during release.

3. In a friction shock absorbing mechanism, the combination with a friction shell having its interior slightly inwardly tapered, the shell being subject to expansion and contraction; of a spring; a plurality of friction shoes cooperable with said shell, said shoes having wedge faces on their inner sides; and a multiple-part pressure receiving and transmitting wedge, said wedge having exterior wedge faces corresponding to and cooperable with said shoe wedge faces, the parts of said wedge having a set of engaging faces inclined at an angle to but unsymmetrically disposed with respect to the axis of the shell, said set of engaging faces of the wedge parts permitting transverse collapse of the wedge during release under forces exerted laterally inwardly from the shell when the latter contracts.

4. In a friction shock absorbing mechanism, the combination with a friction shell; of a spring; a plurality of friction shoes cooperable with the shell, said shoes having wedge faces; and a multiple-part wedge, said wedge having faces directly engaging said shoe wedge faces, said sets of engaging faces extending at one angle relatively to the axis of the shell, the parts of the wedge having cooperating engaging faces inclined at a different angle relatively to the axis of the shell, only one of the parts of said wedge being arranged to directly receive actuating pressure lengthwise of the shell, said part being also provided with one of said shoe engaging faces.

5. In a friction shock absorbing mechanism, the combination with a friction shell having the interior thereof inwardly slightly converged; of a spring; a plurality of friction shoes disposed on the interior of and cooperable with said shell; and a multiple-part wedge interposed between the shoes, said wedge and shoes having engaging sets of faces extending at one angle to the axis of the shell, the parts of the wedge having cooperating engaging faces inclined at a different angle to the axis of the shell, only one of the parts of said wedge being arranged to directly receive actuating pressure lengthwise of the shell, said part having also direct engagement with a friction shoe by means of one of said sets of faces.

6. In a friction shock absorbing mechanism, the combination with a friction shell having interior friction surfaces slightly inwardly converged; of a spring; opposed friction shoes within the shell and cooperable with the latter, said shoes having wedge faces on their inner sides; and a multi-part wedge having wedge faces cooperable with the wedge faces of the shoes, one part of said wedge being extended outwardly beyond the ends of the shoes and adapted to directly receive actuating pressure, said part of the wedge and another part of the latter having engaging faces extending at an angle to and across the axis of the shell and unsymmetrically disposed with respect to the shoes.

7. In a friction shock absorbing mechanism, the combination with a friction shell having interior slightly inwardly converging friction surfaces; of friction shoes cooperable with said shell; a spring; and a multiple-part wedge cooperable with said shoes, all of the parts of said wedge having relatively keen angled wedging engagement with said shoes under actuating forces applied lengthwise of the shell during a compression stroke, the parts of said wedge having blunt releasing angle engagement with each other permitting collapse during release, one part only of said wedge being arranged to directly receive the actuating force.

8. In a friction shock absorbing mechanism, the combination with a friction shell; of a spring resistance; and an expansible friction unit movable within said shell, said unit comprising a plurality of parts with three sets of transversely opposed cooperating faces all inclined relatively to the axis of the shell, two of said sets of faces extending at a keen wedge-acting angle with respect to applied actuating forces, and the other set of faces at a blunt readily releasing angle.

9. In a friction shock absorbing mechanism, the combination with a friction shell having interior longitudinally extending friction surfaces converged; of a spring; and a friction unit including shoes frictionally cooperable with the shell, said unit comprising a plurality of parts with three sets of transversely opposed cooperating faces all inclined relative to the axis of the shell, two of said sets extending at a keen wedging angle with respect to applied actuating forces and the other set at a blunt readily releasing angle.

10. In a friction shock absorbing mechanism, the combination with a friction shell; of a spring; and an expansible friction unit movable within said shell, said unit comprising a plurality of parts having three sets of transversely opposed, cooperating faces all inclined relative to the axis of the shell, at least one of said sets of faces extending at a keen wedging angle with respect to applied actuating forces and at least one of said sets at a different and readily releasing angle.

11. In a friction shock absorbing mechanism, the combination with a friction shell having interior longitudinally extending converging friction surfaces; of a spring; and an expansible friction unit within the shell including shoes frictionally cooperable with the shell friction surfaces, said unit comprising a plurality of parts with three sets of transversely opposed, cooperating faces all inclined relative to the axis of the shell, at least one of said sets of faces extending at a keen wedging angle with respect to applied actuating forces, and at least one of said sets of faces extending at a different and readily releasing angle.

12. In a friction shock absorbing mechanism, the combination with a friction shell; of a spring; a pair of opposed friction shoes each cooperable with the shell; and a two-part wedge between the shoes, each part having keen angle wedging engagement with a shoe with respect to applied actuating forces, the parts having blunt releasing angle engagement with each other.

13. In a draft gear adapted to be mounted on a car and subject to buffing and pulling strains, the combination with a friction member arranged to be held stationary during a compression stroke in one direction and provided with longitudinally extending friction surfaces; of a spring; friction shoes cooperable with said member; and a multiple-part pressure-transmitting wedging device, said device having the component parts thereof engaging said shoes on faces inclined at a keen wedging angle with respect to applied compression forces, parts of said device having also co-acting faces inclined at a different, more obtuse and releasing angle, all of said faces being transversely opposed and one only of said parts being arranged to directly receive the actuating force.

14. In a draft gear adapted to be mounted on a car and subject to buffing and pulling strains, the combination with a friction member arranged to be held stationary during a compression of the mechanism in one direction and provided with longitudinally extending friction surfaces, converging length-wise of said member; of a spring; friction shoes cooperable with said member; and a multiple-part pressure-transmitting wedging device, said device having the parts composing the same engaging said shoes on faces inclined to the center line of the draft gear, parts of said device having also co-acting faces inclined to the center line of the draft gear, at least one set of said faces extending at an acute wedging angle with respect to compression forces applied to the gear and at least one set of said faces extending at a blunt releasing angle, said sets of faces being transversely opposed.

15. In a draft gear adapted to be mounted on a car and subject to buffing and pulling strains, the combination with a friction member arranged to be held stationary during a compression of the mechanism in one direction and provided with longitudinally extending friction surfaces; of a spring; friction shoes cooperable with said member; and a multiple-part pressure-transmitting wedging device, said device having each of the parts thereof engaging one of said shoes on a face inclined to the center line of the draft gear, parts of said device having also co-acting faces inclined to the center line of the draft gear, at least one set of said faces extending at an acute wedging angle with respect to compression forces applied to the gear and at least one set of said faces extending at a blunt releasing angle, said sets of faces being transversely opposed.

16. In a friction shock absorbing mechanism, the combination with a friction member having longitudinally extending friction surfaces relatively converged in the direction of length of said member; of a spring resistance; friction-shoes co-operable with said member; and a multiple-part pressure transmitting wedging device, the parts of said device and shoes having at least three sets of co-operating faces, said sets being transversely opposed with reference to each other, all of said faces of said sets being inclined relative to the line of applied force, at least one of said sets of faces extending at an acute angle to said line and another set at a blunter angle, said keener and blunter angle sets of faces providing an included releasing angle for the part of said device directly receiving the actuating pressure.

In witness that I claim the foregoing I have hereunto subscribed my name this 18th day of June 1920.

JOHN F. O'CONNOR.

Witnesses:
　CARRIE GAILING,
　UNA C. GRIGSBY.